United States Patent [19]
Biggers et al.

[11] Patent Number: 5,222,548
[45] Date of Patent: Jun. 29, 1993

[54] ELECTRICALLY CONTROLLED LIQUID-CRYSTAL HEAT VALVE

[75] Inventors: Rand R. Biggers, Fairborn, Ohio; Jeff W. Rish, III, Lynn Haven, Fla.; Girardeau L. Henderson, Panama City, Fla.; Chuong N. Pham, Panama City Beach, Fla.; Robert R. Fuller, Champaign, Ill.

[73] Assignee: The United States of America as represented by the Secretary of the Navy, Washington, D.C.

[21] Appl. No.: 888,096

[22] Filed: May 26, 1992

[51] Int. Cl.$^5$ .............................. F28F 13/00
[52] U.S. Cl. ........................ 165/46; 165/96; 165/905
[58] Field of Search ............. 165/32, 96, 46, 905

[56] References Cited

PUBLICATIONS

Biggers et al., R.R., *Influence of Electric Fields On Heat Transfer Through Thermotropic Liquid Crystals* Developments In Theoretical and Applied Mechanics, vol. 14, pp. 454 et seq, 1988.

Biggers, R. R. Thermotropic Liquid Crystals: A Variable CLO Material, Materials Science Branch Naval Coastal Systems Center, pp. 1–8, Feb. 1989.

*Primary Examiner*—Albert W. Davis, Jr.
*Attorney, Agent, or Firm*—William C. Townsend; Edward J. Connors; Kenneth W. Dobyns

[57] ABSTRACT

An improved electrically controlled thermotropic liquid-crystal heat valve to control the flow of heat between two bodies of different temperatures by interposing therebetween a fluid layer of liquid-crystal material having a nematic temperature range that includes the temperature of both bodies. This type of heat valve has particular application to any free-swimming divers' diving garments, to provide some thermal protection against the cold ambient water. The heat valve uses stable liquid-crystal materials encapsulated in a sealed environment, with the valves' electrodes being shielded and not in direct electrical contact with the liquid-crystal material. This arrangement essentially completely eliminates the electrochemical effects which can otherwise degrade the liquid-crystal materials, so that the liquid crystal may function for a very long time. The valve is electrically controlled between the respective two different modes of its open and closed conditions, the open mode occurring when a low frequency AC field is applied to one of the liquid crystal materials; and the closed mode occurring when a high frequency field is applied to effect reorientation of the molecules of the liquid crystal materials in a direction perpendicular to the applied AC field, precluding establishment of convective flow cells, thereby retarding the transfer of heat.

10 Claims, 7 Drawing Sheets

ELECTRICALLY CONTROLLED LIQUID-CRYSTAL HEAT VALVE

GOVERNMENT INTEREST STATEMENT

The invention described herein may be manufactured and used by or for the Government of the United States of America for government purposes without the payment of any royalties thereon.

BACKGROUND OF THE INVENTION

1. Field of the Invention

This invention relates to an improved liquid-crystal heat valve for actively controlling and regulating heat transfer between two otherwise thermally isolated bodies. This invention, which has various potential applications to be identified hereinafter, is more particularly applicable to free-swimming oceanic divers' diving garments, for better control of the flow of heat between a diver and the ambient water. In diving garments, regulation of the flow of heat between a diver and the water is a life and death issue and continues to be one of the foremost problems facing the diving community. With too little insulation, a diver may experience hypothermia, caused by severe lowering of body core temperature. With too much insulation, the diver may suffer hyperthermia, which is heat stroke. Either condition can result in death, especially when the diver is at 60 to 100 feet of depth and cannot safely return to the surface immediately.

The diving garments of interest here are those which provide a free-swimming diver with some time-limited thermal protection against the cold.

2. Description of the Prior Art

U.S. Pat. No. 4,515,206 to Edward F. Carr documents the occurrence of anomalous ordering and alignment effects of liquid-crystal fluids in the presence of electric and magnetic fields. Reference is made to the Carr patent for much relevant background information.

Providing adequate thermal protection for divers wearing diving suits remains a problem to be reckoned with. Present diving garments are not adaptable to changing thermal conditions. They generally provide only a constant amount of insulation, regardless of the diver's level of physical activity during diving. At present, the most effective of these garments are of the dry-suit type, which means there is an outer waterproof garment and an inner dry suit of relatively thick insulation. The inner garment is inflated with either the breathing mixture or some other gas to control buoyancy, and the gas also serves to prevent loss of insulation capability due to compression with increasing depth of the dive.

This type of garment can predispose a diver to experiencing both hypothermia and hyperthermia during a single dive. The garment can provide too little insulation when he is at rest and too much when he is active. If the diver is very active in a highly insulating garment, he is in danger of heat stroke. Generally, the diver will chose a garment which provides enough thermal insulation to keep him from suffering loss of mental ability during short periods (15 minutes) when he is at rest.

No present Navy inventory suit provides adequate protection for an inactive free swimming diver in 29° F. water. As the amount of insulation increases, the suit becomes more bulky and mobility is reduced. When the diver becomes active, he must work harder in a bulky suit to do almost any job and is thus more susceptible to hyperthermia. Therefore, there is a need for a means and method to control the thermal protection of the garment without using materials other than those which are easily carried by the diver, such as the amount of power held in easily portable batteries.

The use of thermotropic liquid crystals (TLC) for active regulation of heat transfer between the diver and the water can be used to increase diver thermal protection. Thermotropic liquid crystals comprise a class of mesophase materials with variable heat-transfer characteristics. Use of their unique thermal transport properties in a diving garment can offer a significant increase in diver thermal protection. Various methods and means were set forth in the Carr patent. Carr uses liquid-crystal materials and controls their ability in the nematic phase to transfer heat with applied electric fields. He describes two basic methods for electrically regulating the heat transfer across the liquid crystal.

Carr's first method enforces an overall alignment of the liquid-crystal molecules. If the dielectric anisotropy is positive, the molecules will, in general, all align parallel and in the direction of the applied electric field. This general alignment enhances the transfer of heat between the electrodes. If the dielectric anisotropy is negative, all the molecules will, in general, align perpendicular to the field and the flow of heat between the electrodes will be impeded. The fields applied need to be either DC or AC of less than 1 kHz. This prior art method will only vary the thermal conductivity by a small amount, maybe about a factor of two to three.

Carr's second method of thermal regulation uses the electrohydrodynamic (EHD) motion induced by the applied electric field. An applied AC or DC field sets up convective flow cells via EHD motion and can transfer large quantities of heat. The amount of heat thus transferred can be increased by as much as a factor of 50 or more. A more detailed explanation of EHD and flow cells is found in the Carr patent and in Blinov, Electro-Optical and Magneto-Optical Properties of Liquid Crystals, John Wiley & Sons, especially at page 162.

Both of Carr's methods require relatively small amounts of power to control the heat transfer through the liquid-crystal material. For example, 8 mW of power are required for a cell which is 0.66 cm thick and 2 square cm in area to more than double its effective thermal conductivity. However, for large arrays of liquid-crystal cells, this power requirement is not small, especially if a diver needs to carry the batteries. Carr's patent does not disclose how this power is consumed. If it is all consumed in activating the heat-transfer mechanism, then the application of this heat-transferring effect may be limited due to the power expenditure per watt of heat transferred. If the power is mostly consumed by joule heating, then the amount of required power may be significantly reduced by controlling the liquid-crystal electrical resistivity while maintaining an adequate heat transfer capability. This can be accomplished only if the heat transfer behavior is understood or known in more detail than is presented in Carr's patent.

There are also other serious limitations or unknowns in Carr's aforenamed approaches. With the electrodes of his invention in contact with the liquid-crystal material, certain adverse electrochemical reactions occur. These are described in various prior art publications, including Denat et al, Chemical and Electrochemical Stability of p-Methoxybenzilidene-p-n-Butylanaline, Chem. Phys. Lett, vol. 18, page 235 (1973); Briere et al, Correlation between Chemical and Electrochemical Reactivity and DC Conduction in the Isotropic Phase of a Liquid Crystal p-Methoxybenzylidene-p-n-butylaniline, Mol. Cryst. and Liq. Cryst., vol. 19, page 157: and Barret et al, Dynamic Scattering in Nematic Liquid Crystals under DC Conditions, I. Basic electrochemical analysis, Journal Appl. Phys., Vol. 47, No. 6 (1976), which may be incorporated by reference. The rate of the reactions is roughly proportional to the magnitude of the applied electric field and will be larger for DC than for AC fields. These reactions adversely affect the regulation of heat transfer in the affected liquid crystal. Due to certain chemical reactions, liquid-crystal materials can be rapidly degraded and no longer provide regulated heat transfer. The degrading can occur in as little as a few days in 10,000 volts/cm fields.

Carr's methods also use boundary conditions or large magnetic fields (6 kilogauss) to enhance initial alignment conditions and to return the liquid crystal to initial conditions after removal of the controlling voltages. Using boundary conditions to effect liquid-crystal alignment requires the liquid-crystal thickness usually to be limited to less than 100 microns. A thin liquid-crystal cell cannot function as a good thermal insulator. Large magnetic fields will align thicker liquid crystal cells than 100 microns, but substantial hardware is required to generate and power the field. The Carr patent does not deal with changes in the thermal-transfer ability as the temperature of the working material, i.e. the liquid crystal, is varied. The highest increases in ability to transfer heat occur in the convective cell mode where the heat is transferred by movement of the liquid-crystal molecules across the interface between the two bodies. The temperature dependence of viscosity has been found to strongly affect the liquid crystal's capability to transfer heat, as shown in Table 1 hereinafter. At a given frequency and an applied voltage, lowering the liquid crystal's temperature while still remaining within the nematic phase significantly decreases the ability to transfer heat, as shown in FIG. 10.

Additionally, the Carr patent fails to describe or suggest any contemplated liquid-crystal encapsulation, such as the improved heat valve of the type being described in this present invention. Only the generalized connecting of the two bodies by the liquid crystal is discussed in that patent. Although, in general, liquid crystals tend to be inert, chemical reactions and or chemical contamination with nonliquid-crystal materials can occur as discussed in the references cited above. These adverse occurrences can severely degrade the thermal-transfer capabilities. Accordingly, the materials in contact with the liquid crystal must be carefully chosen.

The thermotropic liquid crystals (TLC) can have a large coefficient of thermal expansion. The method of encapsulation, as proposed herein, takes this into account to prevent leakage from and the formation of bubbles in the encapsulated cell.

OBJECTIVES OF THE INVENTION

The present invention provides a novel encapsulated form of liquid-crystal heat valve which provides significantly increased efficiency of heat transfer and consistent performance over long periods.

The invention provides a novel improved electronically controlled encapsulated heat valve in a cell form made of materials which do not contaminate or alter the thermotropic liquid crystals (TLC)

This improved heat valve enables a more accurate prediction of the amount of heat transfer with more accurate control for known types of liquid crystal over a wide temperature range, a wide applied AC voltage range, and a wide frequency range with less power consumption. The invention provides a heat valve, which is more than a heat switch. A heat switch provides a maximum or a minimum heat flow heat flow, i.e. of being on (maximum) or off (minimum), while a heat valve is capable of continuous control through a range of intermediate values in addition to the on condition (maximum) or the off condition (minimum).

The invention provides a novel method of fabricating the improved liquid-crystal heat valve which includes encapsulation of the crystal material.

The improved liquid-crystal heat valve (LCHV) is used in conjunction with a composite diving garment to maintain a diver's temperature much closer to an optimum level, and to facilitate the transfer of excess heat from the diver to the ambient water at a minimum power cost when the diver is active, thereby providing significantly increased safety and thermal comfort to divers working actively in cold water.

These and other objects and advantages will become more apparent from the following detailed description taken in conjunction with the following illustrative drawing figures.

DETAILED DESCRIPTION OF PREFERRED EMBODIMENTS

The term liquid-crystal heat valve may be referred to as LCHV, the thermotropic liquid crystal TLC, and electrohydrodynamic motion as EHD motion.

It is to be understood that a TLC, whether comprised of a single substance or a eutectic mixture, examples to be given hereinafter, can exhibit EHD motion and a large effective thermal conductivity (heat transfer capability) at a minimum power cost when under but not restricted to the following conditions, that is when:
1. The TLC is in the nematic phase.
2. The TLC has a dielectric anisotropy between $-1.2$ and 0.6, with the best results having been achieved near $-0.6$. See Biggers, cited above.
3. The electrical anisotropy of the TLC is positive.
4. An AC voltage of at least 4.6 kV rms per cm is applied from 15 to 150 Hz.
5. The TLC sample is thick enough, 0.2 cm or greater, such that boundary alignment effects are unimportant and that under no-field conditions the liquid crystal acts as a good insulator.
6. The TLC is encapsulated in a cell made of materials which do not chemically contaminate or alter the TLC.
7. The electrical resistivity of the TLC is about $10^{+10}$ ohm-cm at 25° C.

Exhibit of an increased insulation capability occurs when under but not restricted to the following conditions, that is when: Conditions 1, 2, 3, 5, 6, and 7 are met as defined above and the condition of 4 is changed from a range of 15 to 150 Hz to a range of 160 to 500 Hz.

Further significant amounts of heat can be generated by the liquid crystal for strictly heating purposes when under but not restricted to the following conditions, that is when: Conditions 1, 2, 3, 5, 6 and 7 are met as defined above and the condition of 4 is changed from a range of 15 to 150 Hz to a range of 600 to 900 Hz, where the liquid crystal used is a eutectic mixture such as TN3252 and TN6459 as available from Roche Vitamins and Fine Chemicals.

Figure 1:
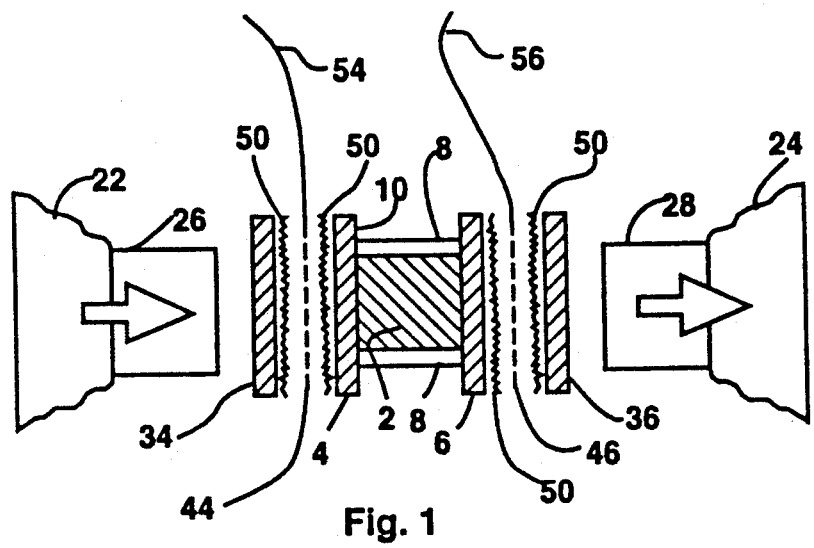
FIG. 1 is an exploded of our liquid-crystal heat valve, with some parts in cross section, interconnecting two otherwise thermally isolated bodies of different temperatures.
Figure 5:
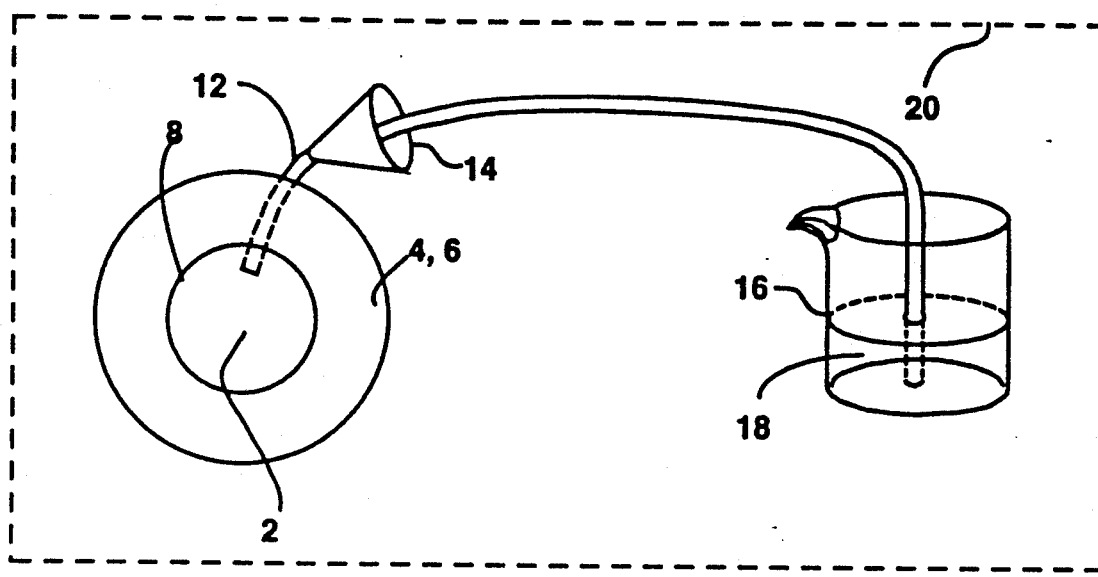
FIGS. 5 and 6 are diagrammatic views representative of the method and apparatus for filling the liquid-crystal heat-valve cell.
Figure 6:
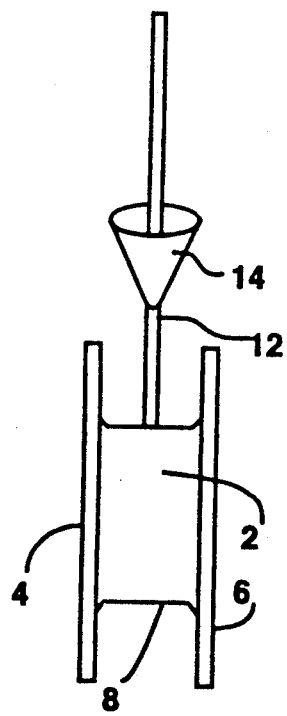

The construction of our improved functional liquid-crystal heat valve will first be generally described as it is illustrated in FIG. 1. The TLC material 2 is encapsulated in cell-like form between two high thermal conductivity and high electrical resistivity end-disks 4 and 6 and a tubular sleeve spacer 8. Sapphire is an excellent material for the end disks 4 and 6 and thin-walled non-reactive plastic material such as Teflon is appropriate for the spacer 8. All the encapsulation materials need to be essentially chemically inert and waterproof. The sapphire disks 4 and 6 can be sealed to the Teflon spacer sleeve with a non-contaminating epoxy or adhesive 10 such as Torr Seal, a commercially available product made by Varian Associates, Vacuum Products Division, of Lexington, Mass. Better adhesion is obtained if the Teflon spacer has a larger diameter at the ends and has been etched. The encapsulation cell can be vacuum filled, per FIGS. 5 and 6, using a fill-tube 12 about 30 cm long, of small diameter Teflon inserted into the same diameter hole in the spacer wall and sealed in place preferably with the aforesaid epoxy sealant Torr Seal. The Teflon fill-tube 12 has a heat sealable plastic bag 14 sealed to the tube 12 within 3 cm of the spacer. The fill-tube 12 protrudes through the non-sealed end of the bag. The protruding end of the fill-tube is inserted in a small flask reservoir 16 containing the liquid-crystal material 18 to be used. The encapsulation cell and the flask are placed in a vacuum oven 20. The oven is evacuated and the temperature is elevated to a level where water vapor and other trapped gases will offgas from the liquid crystal. A temperature of 50° C. is high enough for a liquid crystal such as p-methoxybenzylidene p-(n-butyl)aniline (MBBA). The vacuum is generally applied for a few hours, until the rate of offgassing has subsided to less than a bubble every 10 seconds. Then the oven is slowly repressurized with a dry pure gas such as nitrogen. The containment cell will fill without entrapment of bubbles. Upon removal from the oven, the fill-tube 12 is cut near but beyond the point where the plastic bag 14 is attached to the tube 12. The bag 14 is then partially filled with more liquid crystal until the end of the tube in the bag is covered plus an additional 0.5 cm beyond it. The remaining air in the bag can be squeezed out and the bag 14 sealed. The bag acts as a pressure reservoir to prevent bubbles from forming or leaks occurring in the containment cell during temperature changes when the crystal material contracts and expands.

A more specific description follows of an exemplary functional form of our improved valve. In one preferred construction, the liquid-crystal material 2 in the nematic phase having a negative dielectric anisotropy, is retained within the short length of tubular spacer material 8 having low thermal conductivity, in an encapsulated form by the two aforesaid end disks 4 and 6. The sapphire disks 4 and 6 can be effectively sealed to the opposite preferably etched ends of the Teflon spacer 8 as previously stated by means of a non-contaminating epoxy adhesive 10. These components are joined together as aforesaid, and the respective end disks 4 and 6 are put into good thermal contact with one of the otherwise thermally isolated bodies, 22 and 24 by direct contact or by means of respective high thermal conductivity ceramic pieces or heat pipes 26 and 28. However, each disk 4 and 6 respectively has a mating disk 34 and 36 attached to it over respectively interposed high voltage electrodes 44 and 46, respectively, sandwiched therebetween. The purpose of disks 34 and 36 is to electrically isolate the electrodes from their surroundings. Thermal grease 50 is preferably used to make good thermal contact between the respective electrodes before becoming sandwiched between the end disks or plates. The electrodes are electrically insulated from the liquid-crystal material 2. The pairs of sandwiching disks may be operatively adhesively joined by the same type of epoxy adhesive as is used at 10.

Figure 7:
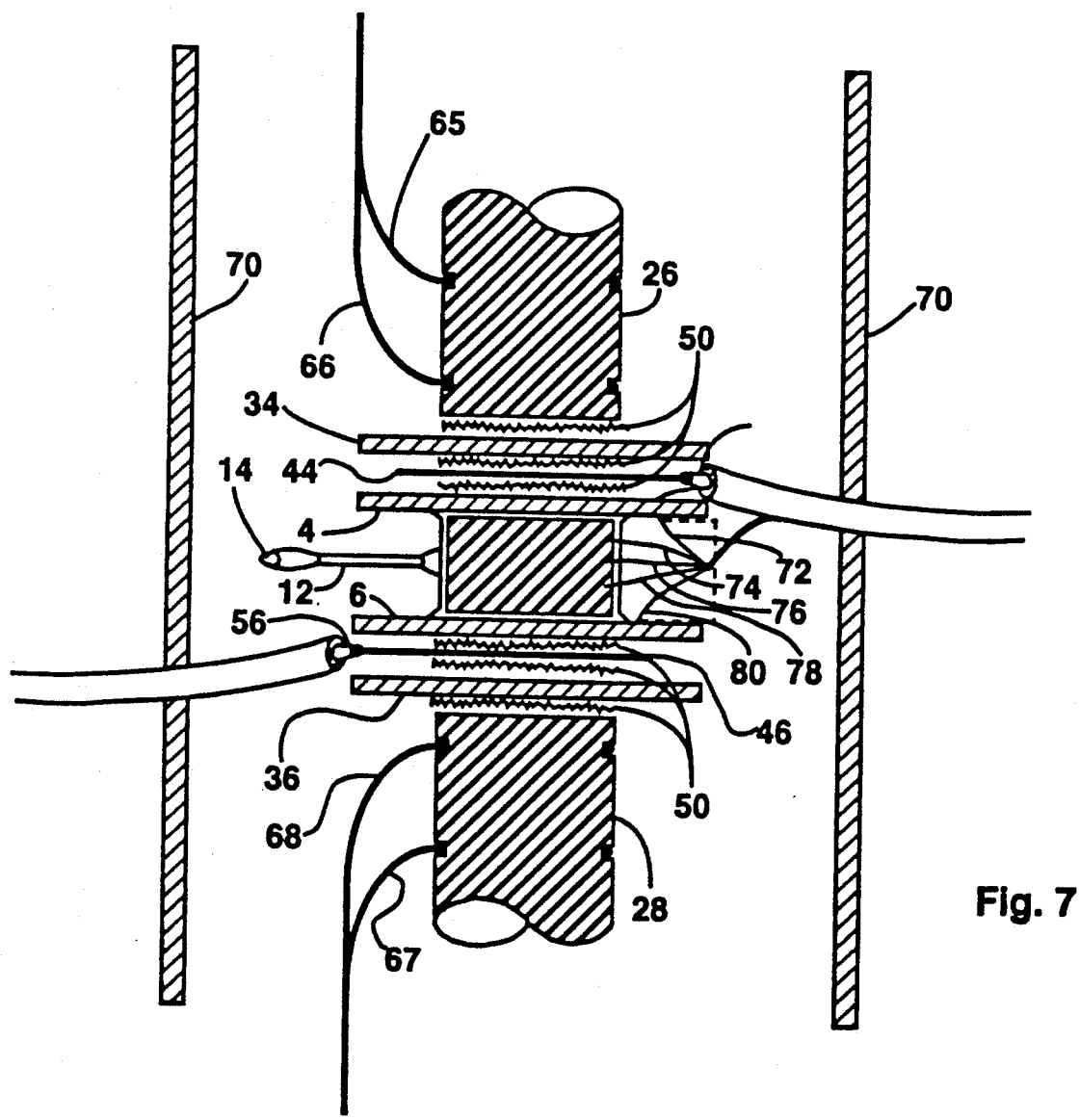
FIG. 7 is a more detailed exploded view of the heat valve of FIG. 1 disposed between/within copper shielding means shown more completely in FIG. 8.

Thin copper or other high electrical conductivity material can be used for electrodes 44 and 46 and placed on the exposed sides of the sapphire containment disks 4 and 6, as shown in FIG. 7, or the exterior surfaces of disks 4 and 6 can be coated with an electrically conducting material, e.g., gold, using vacuum vapor deposition techniques or other suitable methods. The electrodes must be smaller in diameter than the containment disks and attached to the disks with a high thermal conductivity grease or paste. Electrical leads 54 and 56 are attached to the exposed electrodes. The edges of the respective sapphire-electrode-sapphire disk assembly are electrically sealed with an excellent electrical insulator such a Corona Dope or electrical tape.

The exposed surfaces of the sapphire disks are well connected thermally to the objects over which temperature control is desired and to the heat source or sink. The constructed exemplary LCHV is now in place, ready to perform.

The liquid-crystal material, whether a single substance or mixture of different liquid crystals, is chosen or chemically altered to have a nematic temperature range that includes the temperatures of the two bodies 22 and 24, and, if possible, extend at least 20° lower than the lowest expected body temperature. The heat valve is controlled or actuated from an open condition of high effective thermal conductivity of the liquid crystal, to a closed condition of very low effective thermal conductivity, with an applied high-voltage AC field. The AC field is applied across the electrodes and generally has a strength of 2 kV/cm to 30 kV/cm. The AC field strength required to allow the flow of heat desired is dependent on the distance between the end plates bounding the liquid crystal. The AC field is supplied by a variable-frequency high-voltage power supply (not illustrated). The maximum transfer of heat in the full-open condition on the valve is achieved at predetermined frequencies that depend on the temperature, electrical resistivity, dielectric anisotropy, and electrical anisotropy of the liquid-crystal material. In the thermal conductivity curve shown in FIG. 9, this predetermined frequency for maximum transfer of heat is about 70 Hz. The electrical resistivity of the liquid-crystal material is adjusted by the addition of known ionic impurities, such as 2LI-235, a conducting salt for nematic phases, available from E.M. Chemicals Company. The strength of the dielectric anisotropy is similarly adjusted by the addition of other but different dielectric anisotropy liquid crystals, which together form a euectic TLC. The resulting magnitudes of the electrical resistivity and dielectric anisotropy determine the maximum heat-transfer capability in the full open condition and the cost in required driving power. The minimum heat-transfer capability in the closed condition is also achieved at predetermined frequencies and is dependent on the same liquid-crystal parameters. The minimal amount of heat transfer achieved in this closed or thermally insulating condition is determined by the magnitudes of the electrical resistivity and dielectric anisotropy set for the full open condition. Generally, when the electrical resistivity is adjusted to provide the maximum heat transfer capability at less than 100 Hz and at a liquid crystal midpoint temperature of 30° C., minimum heat transfer is also provided at 300 Hz or higher.

The rate of heat transfer in the open or closed condition depends on the magnitude of the applied AC field. If an ordinary 120 volt 60 Hz line is available to drive the power supply, the rate is determined by the magnitude of the voltage at which arcing from the electrodes occurs. Fields in the range of 30 kV/cm can be achieved with good insulation around the electrodes and liquid crystal thicknesses of 0.635 cm., for example. If batteries are the main source of power because the apparatus must be portable, then the maximum will be less and minimum more than that for the unlimited power case.

The open and closed positions are attained by two different modes of operation of the liquid-crystal material under AC fields. The first mode operates when a low frequency AC field, in the range of 15 to 130 Hz, and having a voltage gradient of about 2 kV/cm or more, is applied to one of the liquid-crystal materials altered as described above. The ionic impurities physically separate by charge sign and form dipoles. The resultant torque on the dipoles and the stabilizing effect of the negative dielectric anisotropy of the liquid-crystal molecules allow three-dimensional convective flow cells to form. These tubular flow cells contain the moving liquid-crystal molecules believed to be driven by the in-phase movement of the impurity ions with the applied AC field. The circulation of the liquid-crystal material via tubular flow cells from one end plate to the other transfers the heat across the heat valve. The velocity of the flow increases with increasing voltage gradient of the applied AC field. Hence the heat valve becomes "more open" with higher voltage-gradient low-frequency AC fields.

The second mode of operation involves an average realignment of the liquid-crystal material molecules to a direction in which the molecules retard the transfer of heat between the end plates. In this mode, a field having a high enough frequency is applied, on the order of 300 Hz or higher for the previously described adjusted liquid crystal, such that the ionic impurities cannot separate and form dipoles, or those that are already separated due to prior conditions cannot move, in a direction perpendicular to and in phase with the applied AC field. Therefore, no convective flow cells are set up. The negative dielectric anisotropy of the liquid-crystal material means the molecules will prefer to align with their long axes in a direction perpendicular to the applied AC field, which is the orientation most restrictive to the transfer of heat between the end plates.

Figure 2:
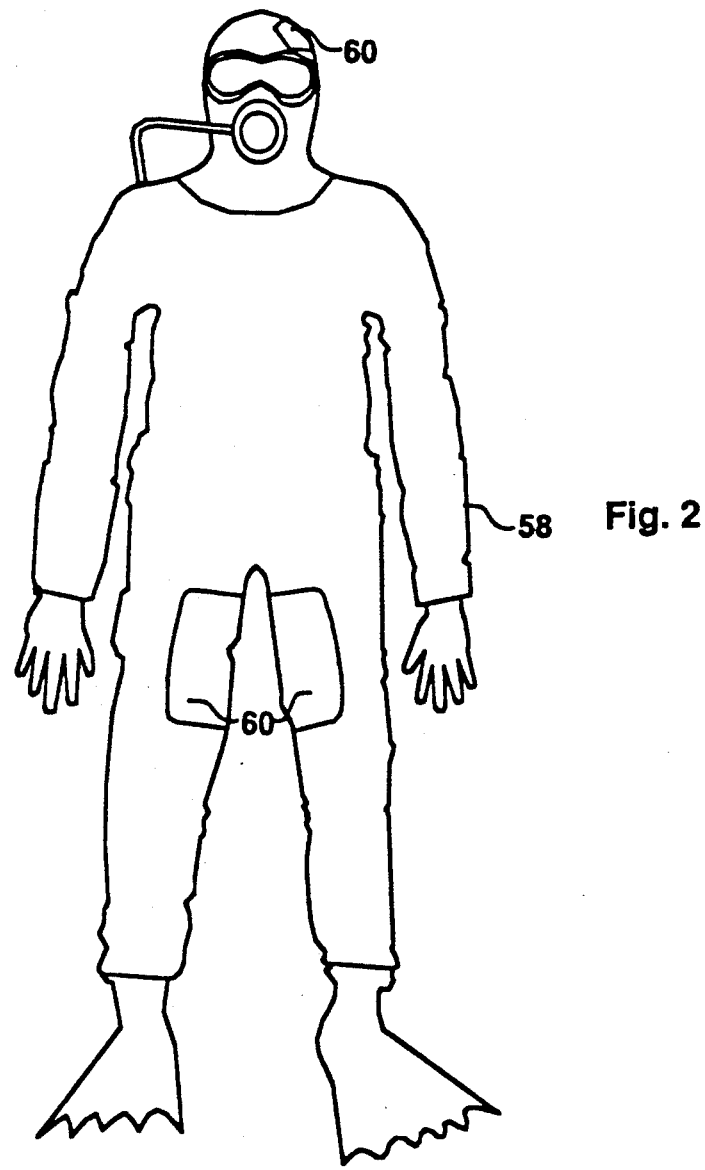
FIG. 2 is a view of a generic diving suit with a liquid-crystal heat valve installed therein.
Figure 3:
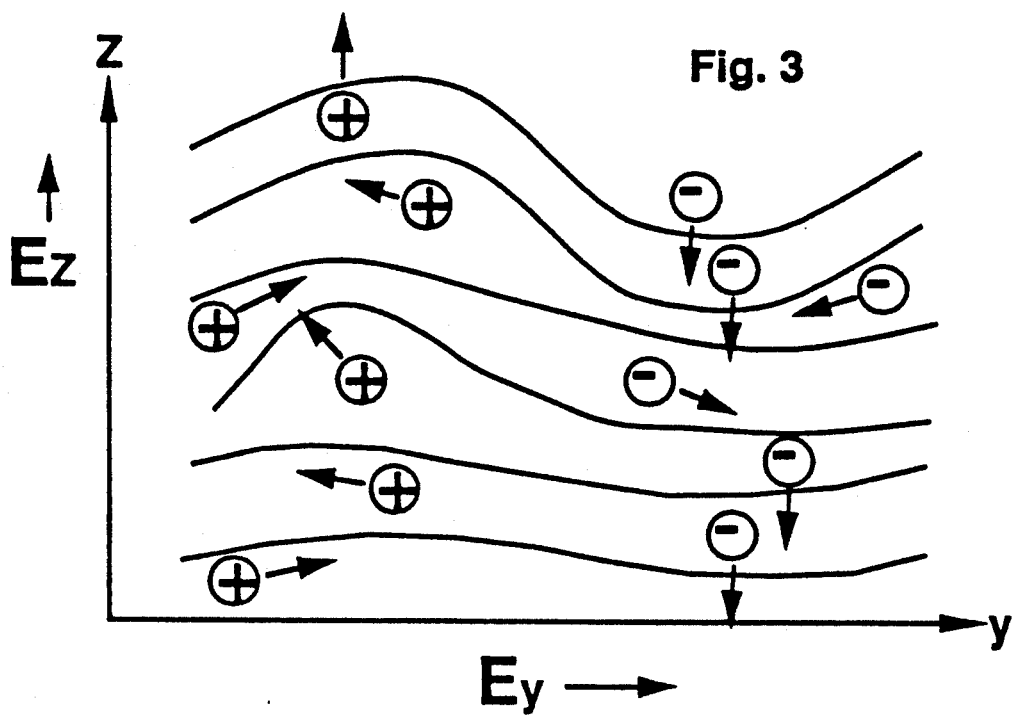
FIG. 3 is an overly simplified graphic depiction of net space charge separation and buildup in the region of a bend deformation due to the applied electrical field $E_z$, wherein the solid lines indicate the general direction of alignment of the long axes of the liquid-crystal molecules.
Figure 4:
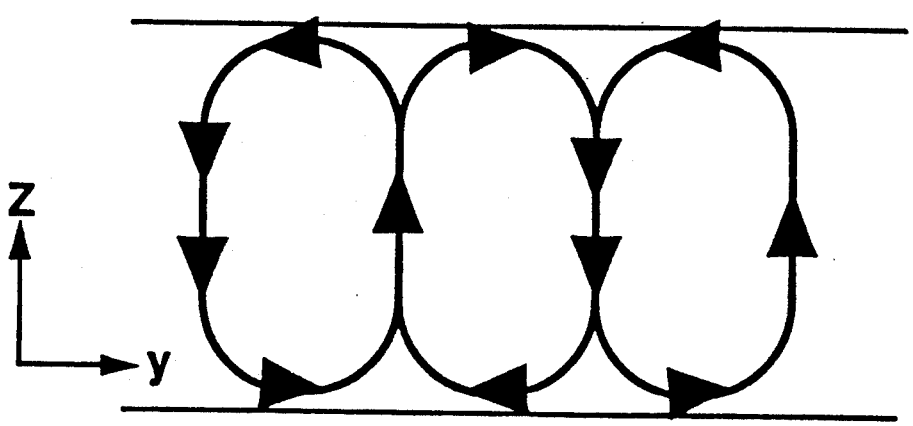
FIG. 4 is a diagrammatic two-dimensional view showing convection heat cells formed from the distortions induced by the applied electrical current field $E_z$, whereby heat is transported within the z-y plane between the two end surfaces by movement of the liquid-crystal molecules in the regions indicated by the arrows.

FIG. 2 illustrates a generic diving suit 58, as worn by a diver. No special type of diving suit is intended to be illustrated by this figure, and it could represent a tethered or free-swimming suit, of a wide variety of types. Built into some location on the surface of the suit, but not necessarily the one illustrated, is a liquid-crystal heat valve of the general sort described elsewhere herein. The valve treats the inside of the suit, adjacent to the diver's body, as its hot body 22 and the outside of the suit, adjacent to the ambient water, as its cold body 24. Control mechanism in or on the suit (not illustrated) controls the heat conductivity of the liquid-crystal valve, thereby controlling how much of the heat within the suit is vented to the ambient water.

During experimental laboratory testing, the heat valve has been operated in the open position with a thermal conductivity of about one half that of mercury, which is a relatively good thermal conductor. In the closed position, thermal conductivities of 6 to $9 \times 10^{-4}$ Cal/cm-sec-° C., which is approaching one half that of glass, a very good insulator, have been achieved. Overall, the thermal conductivity can be varied by a factor of 15 or more simply by changing the frequency of the applied AC field. Generally under no-field conditions, heat transfer is less than the thermal conductivity of glass, a "cracked open" heat valve position.

The equivalent thermal conductivities given above are in reference to a liquid-crystal material with a dielectric anisotropy of −0.6, electrical resistivity of about $1.4 \times 10^{+10}$ ohms-cm, a temperature drop across the liquid crystal of about 3° C. at zero field, and a nematic range from at least 4° to 41° C.

As indicated by the foregoing description, the LCHV is actuated by the application of a large AC voltage at a specific frequency. In an additional example of LCHV, where the liquid-crystal material is N-(p-methoxbenzylidene)-p-butylaline (MBBA) having an electrical resistivity of $1.4 \times 10^{+}$ ohm-cm, the frequency for the most rapid heat transfer is 60 Hz at 27° C. For more details, see Table 1, which follows.

TABLE 1

| MBBA Thermal Behavior at 6 $kV_{rms}$ | | | |
|---|---|---|---|
| T (°C.) | $k_{max}(T) \times 10^{-4}$ (cal/cm-sec-°C.) | $f_{kmax}$ (Hz) | $f_{kmin} < k_o$ (Hz) |
| 4 | 12 | 13 | ≈75 |
| 9 | 13 | 17 | ≈107 |
| 14 | 14 | 27 | ≈105 |
| 18 | 16 | 30 | ≈106 |
| 22 | 21 | 45 | ≈157 |
| 27 | 27 | 60 | ≈225 |
| 32 | 37 | 80 | ≈303 |
| 36 | 45 | 90 | ≈377 |

T = average temperature MBBA LCHV
$k_{max}(T)$ = maximum effective thermal conductivity at some T
$f_{kmax}$ = frequency at which $k_{max}$ occurs
$f_k < k_o$ = frequency at which k becomes less than the no-field $k_o$ of $9.6 \times 10^{-4}$ (cal/cm-sec-°C.)
$\rho = 1.4 \times 10^{+10}$ (ohm-cm) electrical resistivity of this MBBA sample Although in general TLC are excellent thermal insulators, the insulation capability may be increased by applying a large AC voltage at a high frequency such as 230 Hz or more for MBBA of the above resistivity and temperature. For examples, see the last column of Table 1. At this frequency, the space charge can no longer separate far enough in a direction parallel to the electrodes and induce convective flow between the electrodes. The effect now is to reorient the molecules' long axes perpendicular to the applied field since the MBBA's dielectric anisotropy is negative.

For a thicker MBBA cell, for example about 1.25 cm, and at large temperatures differences, for example 15° C. or more between the two bodies to be controlled, MBBA can remain in this most restrictive to heat-transfer orientation even after the high frequency field is removed. This condition remained stable even under the application of previously convection inducing fields. Raising the average temperature of the whole LCHV by 5 to 10 will destablize this condition and subsequent field application will again induce flow cells.

Figure 8:
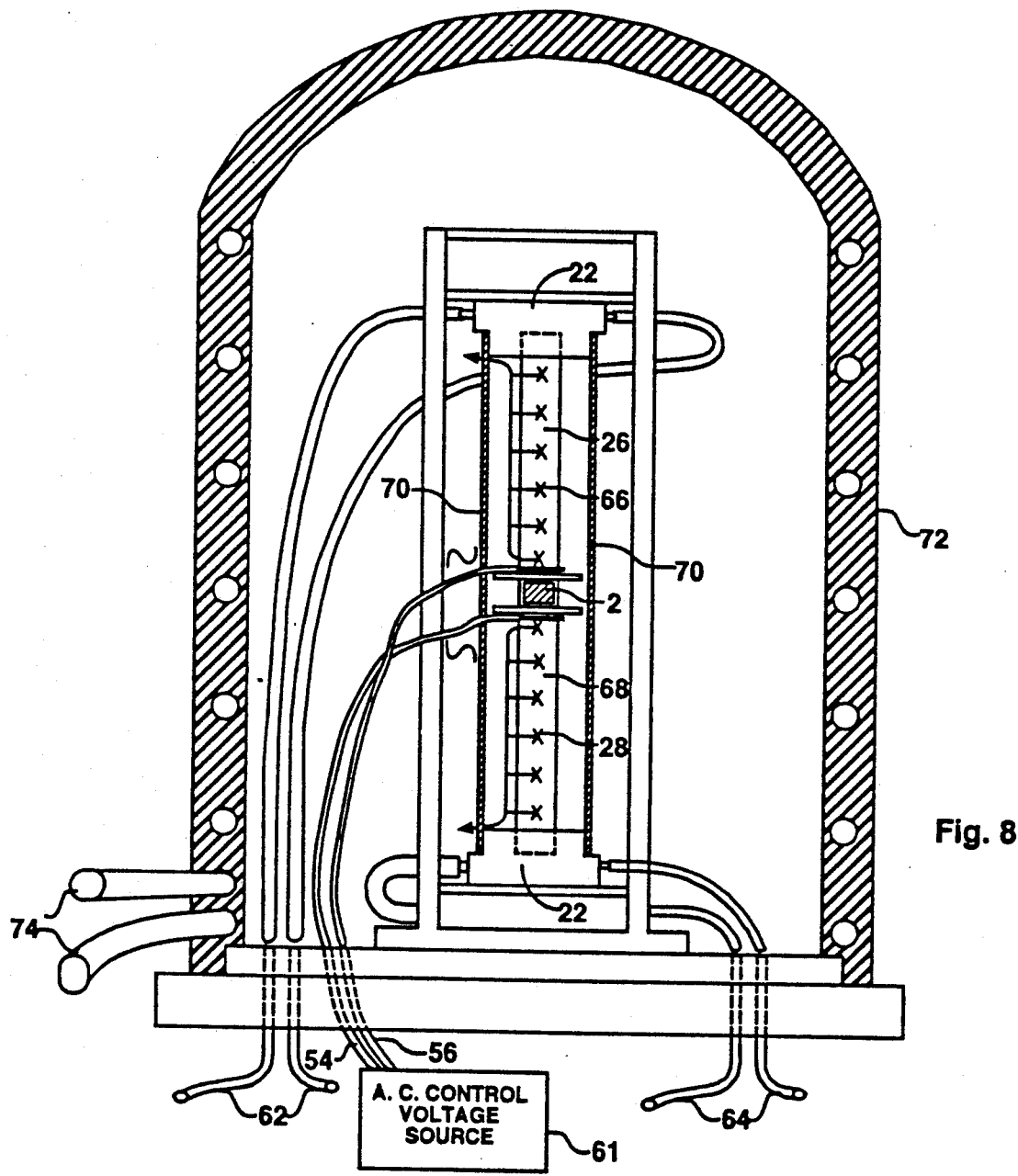
FIG. 8 is a vertical cross-section diagrammatic view of a liquid-crystal thermal conductivity experiment during the development of this improved liquid-crystal heat valve.

The LCHV effect was evaluated in a series of ongoing experiments. The experimental setup is depicted in FIG. 8. A detailed explanation of the experiment can be found in Biggers et al, "Heat Transport through MBBA due to Induced Electrohydrodynamic Motion," submitted for publication to Molecular Crystals and Liquid Crystals, and in Biggers et al, "Influence of Electric Fields on Heat Transfer through Thermotropic Liquid Crystals," published in Developments in Theoretical and Applied Mechanics, Vol. 14, A. Smith, editor, page 454 (1988). A brief discussion of the experiment follows. In principle, the evaluation of a heat valve is simple. A temperature difference ΔT is placed across the heat valve 2, which is actuated by an applied control voltage applied between terminals 54 and 56 by a control voltage source 61. The heat valve is actuated into its open condition and the flow rate (heat/sec) of heat being transferred is represented by the equation $q = kA \Delta T/d$, where k is the effective thermal conductivity, A is the cross-sectional area, and d is the thickness of the valve. The experiment produces the ΔT using two constant temperature circulators (not illustrated), one circulating a hot antifreeze solution through tube 62 to a first thermally isolated body, in this case an aluminum head 22, and the second circulating a cold antifreeze solution through tube 64 to a second thermally isolated body, in this case a second aluminum head 24. Two columns 26 and 28, of low thermal conductivity, made of glass-ceramic, serve to thermally connect the circulators via their sealed connection within respective aluminum heating and cooling heads 22 and 24 to the LCHV 2. Type T thermocouples such as 66 and 68 mounted on the respective columns 26 and 28 and thermocouples 72 to 78 mounted on the LCHV 2 in FIG. 7 measure the temperature gradient resulting from heat that axially enters and leaves the LCHV plus the ΔT across the LCHV. The thermal conductivity k of the LCHV can be found by rewriting the above equation as $k = qd/A \Delta T$ and solving for k. Although not necessary for the present disclosure, the full derivation and additional corrective terms will be found in the cited Molecular Crystals and Liquid Crystals reference. Variations in the magnitude of k reflect the performance of the LCHV. The minimum k occurs at the full closed condition and the maximum k occurs at the full open condition.

To acquire useful measurements of k, the columns and LCHV area must be thermally shielded from external effects. Copper foil 70 is thermally anchored to the hot and cold thermally isolated bodies or aluminum heads 22 and 24 of the test apparatus, forming a cylindrical thermal shield around the columns and the LCHV. Further thermal shielding is provided in the test apparatus by enclosing the entire system within a bell-jar 72 and by maintaining the bell-jar at the LCHV's predetermined midpoint temperature by the use of a third circulator (not illustrated) circulating fluid at that temperature through a tube 74 which runs through the walls of the bell-jar.

These columns 26 and 28 were cut sufficiently long in the test apparatus to minimize the influence of end effects on the heat fluxes calculated at the ends of the columns nearest the LCHV. Heat transfer through the columns and sample was treated as one-dimensional with corrections applied to account for thermal contact resistances and for parallel heat transfer through the Teflon portion of the encapsulating container.

The experimental development procedure was as follows. The temperature drop between the heating and cooling heads 22 and 24 was selected so that the temperatures on either side of the sample encapsulation region would insure that the MBBA sample would remain in the nematic phase. Some of the developmental test data were obtained with the upper head maintained at 40° C. while the lower head was kept at 20° C. Ambient bell-jar temperature was set at the average temperature of the two heads to minimize environmental influences.

Ambient bell-jar temperatures were regulated to within ±1° C., and fluid temperatures within the circulators were stable to within 0.02° C. Heat loss or gain between the fluid input and output openings in the heads was deemed to be insufficient in magnitude to jeopardize the repeatability of the results.

Computer control was used to achieve stable head reference temperatures (measured at a specific surface location) which were within ±0.1° C. of the desired settings and had standard deviations less than 0.02° C. The four thermocouples nearest the sample were then monitored for stability. A standard deviation of less than 0.03° C. in the temperature reading of each thermocouple from one reading to the next was required prior to the acquisition of temperature data.

All temperatures, applied voltages, frequencies, and other experimental parameters were be computer set and controlled with this equipment. Up to 9 different experiments could be preset. The computer was programmed to run the experiments 24-hours-a-day for up to 7 days before new experiments could be entered.

In connection with a program for evaluating diving garments for the Navy Department, the inventors have worked on a development program which has documented and discovered novel and more efficient methods for controlling heat-transfer through TLC. Much of their work recorded in the two Biggers et al articles, both cited above.

Many new approaches and methods were required to overcome certain inherent limitations in the approach described in the Carr patent. The following examples are representative of many of the inventors' developmental discoveries and improvements.

1. The active regulation of heat transfer or the LCHV effect also takes place for AC fields when the electrodes are electrically insulated and physically removed from the liquid-crystal material. See the two Biggers et al articles cited above, and Van Winkle et al, Electrohydrodynamic Flow in Thick Liquid Crystal Cells, Mat. Res. Soc. Symp. Proc. Vol. 177, p. 311 (1990)
2. The magnitude of the LCHV effect, that is, how much heat is transferred, is strongly frequency-dependent and temperature-dependent at a constant applied field strength. See Table 1 above.
3. There is a direct correlation between the electrical resistivity of the liquid crystal and the magnitude of the heat transfer capability at a given voltage and frequency. For example, at 32° C., 60 Hz, and 6 kV rms, a MBBA sample with a resistivity about $7.4 \times 10^{+8}$ ohms-cm has an effective thermal conductivity k of 11 in arbitrary units. See Table 2, following. Another MBBA sample with a higher resistivity of about $1.4 \times 10^{+9}$ ohm-cm, has a k of 37 under the same conditions.
4. Values have been established for electrical resistivity, voltage, dielectric constant, and frequency, (for more detail, see Table 3) which, when met, provide for significantly increased efficiency of heat transfer, i.e. minimizing the amount of power required to transfer a given amount of heat. This is broadly shown in FIG. 9. Low resistivities, less than $10^{+9}$ ohm-cm, consume significant amounts of energy and results in joule heating of the LCHV. About 9 times the amount of power is consumed by the lowest-resistivity MBBA sample as by the higher resistivity MBBA sample to produce the same k. Compare these in the last two columns of Table 2. The power consumed/dissipated q is the difference between the heat/sec entering and that leaving the LCHV. This q can be related to the applied voltage $V_{rms}$ and the liquid-crystal electrical resistivity $\rho$ by the equation $q = V^2_{rms}A/\rho d$, where a is the area and d the thickness of the LCHV.

TABLE 3

VALUES OF THERMOTROPIC LIQUID-CRYSTAL MATERIAL PARAMETERS WHICH MAXIMIZE HEAT-VALVE PERFORMANCE a. Dielectric anisotropy $\Delta\epsilon \approx \epsilon_\| - \epsilon_\perp \approx -0.6$
b. Electrical anisotropy $\Delta\sigma = \sigma_\| - \sigma_\perp > 0$
c. Electrical resistivity $\rho \approx 10^{+10}$ (ohm-cm)
d. Viscosity $\gamma \leq 77$ (centipoise) at room temperature
e. Chemically nearly inert and not a Shiff-base material
f. Nematic range wide enough to cover the required operating range of the heat valve. The low temperature end of the nematic range should be well below the lowest anticipated operating temperature, i.e., at least 20° C.

5. Reducing the liquid crystal's viscosity significantly increases the heat transfer capability. See this in Table 1, column 2, where the viscosity has been decreased by raising the temperature of the TLC. Picking a TLC with a very low viscosity is believed to provide an increase in the thermal-transfer capability of the LCHV at all temperatures.
6. The desired electrical resistivity in the preceding item 4 can be met by doping of a pure, high-resistivity single-substance liquid crystal or eutectic liquid-crystal mixture with positive and negative ions such as ZLI-235 made or distributed by E.M. Chemicals Company.
7. High frequency voltages, such as frequencies above 310 Hz for a liquid crystal at 32° C. with a resistivity greater than $10^{+9}$ ohm-om, minimize the heat transferred and provide the full closed valve condition in the LCHV. See Table 2 above. At lower temperatures but at the same resistivity, the full closed position occurs at progressively lower frequencies. See Table 1, column 4.
8. At large temperature differences, such as 15° C., across the LCHV, the thermal conductivity can be

TABLE 2

| | MBBA Thermal Behavior at 6 kV$_{rms}$ and T = 32° C. | | | | | |
|---|---|---|---|---|---|---|
| $\rho$(rho) (ohm-cm) | k(60 Hz, T) × $10^{-4}$ (cal/cm-sec-°C.) | f$_{kmax}$ (Hz) | f$_k$ < k$_o$ (Hz) | q(f$_{kmax}$) (mw) | f(k = 37) (Hz) | q(k = 37) (mw) |
| ≈1.4 × $10^{+10}$ | 37 | 60 | 303 | 8 | 60 | 7 |
| ≈6.0 × $10^{+9}$ | 25 | 130 | 720 | 16 | 105 | 14 |
| ≈7.4 × $10^{+8}$ | 11 | 300 | 1000 | 95 | 210 | 60 |

$\rho$ = electrical resistivity of the particular MBBA sample lot
k(60 Hz, T) = effective thermal conductivity at 60 Hz
f$_{kmax}$ = frequency at which k$_{max}$ occurs
f$_k$ < k$_o$ = frequency at which k becomes less than the no-field k$_o$ of 9.6 × $10^{-4}$ (cal/cm-sec-°C.)
q = measured amount of joule heating, power dissipated as heat, at f$_{kmax}$ maintained even when the high frequency field is removed.

9. Because the flow cells are turbulent in nature, the convective mechanism is more effective in transferring heat quickly than is steady state flow.

Figure 9:
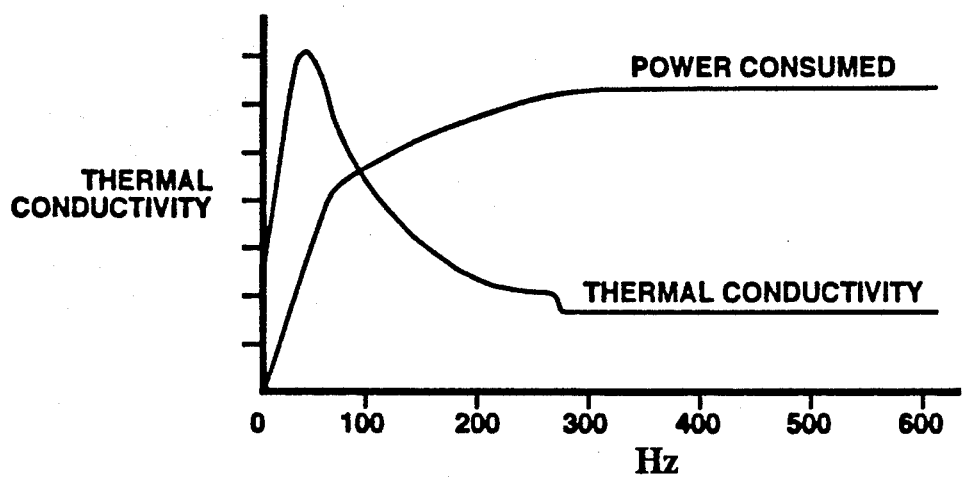
FIG. 9 is a graph illustrating two relationships, first between the liquid crystal's power requirement versus the applied frequency, and second, between its thermal conductivity versus the applied frequency.
Figure 10:
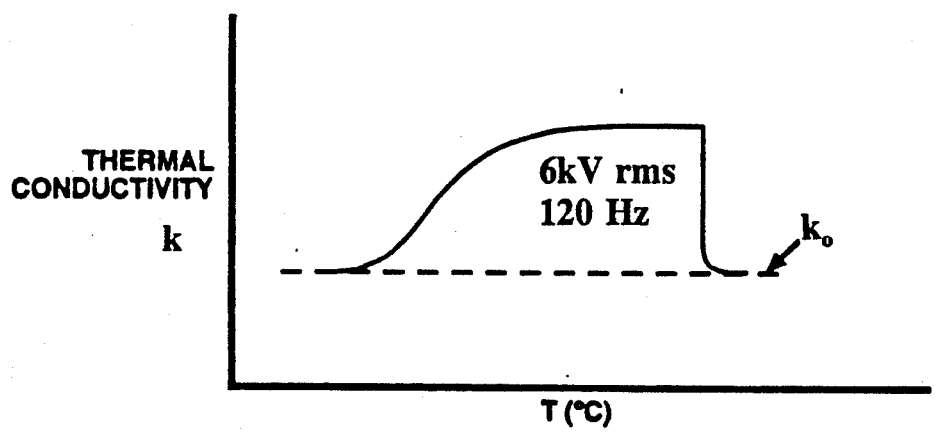
FIG. 10 is a plot portraying the change in effective thermal conductivity k at a constant voltage and frequency as the liquid crystal's temperature is varied over a wide temperature range. The sharp decrease in k indicates a transition from the nematic to isotropic phase. The dashed line represents a no-field thermal conductivity.
Figure 11:
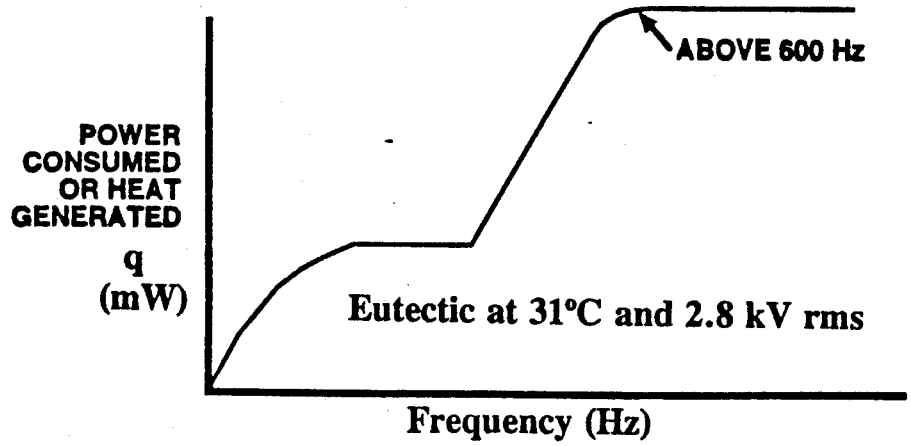
FIG. 11 is a plot displaying the activation of a liquid crystal as a resistance heater. At frequencies above 600 Hz there is an almost tripling of the heat generated at a constant voltage.
Figure 12:
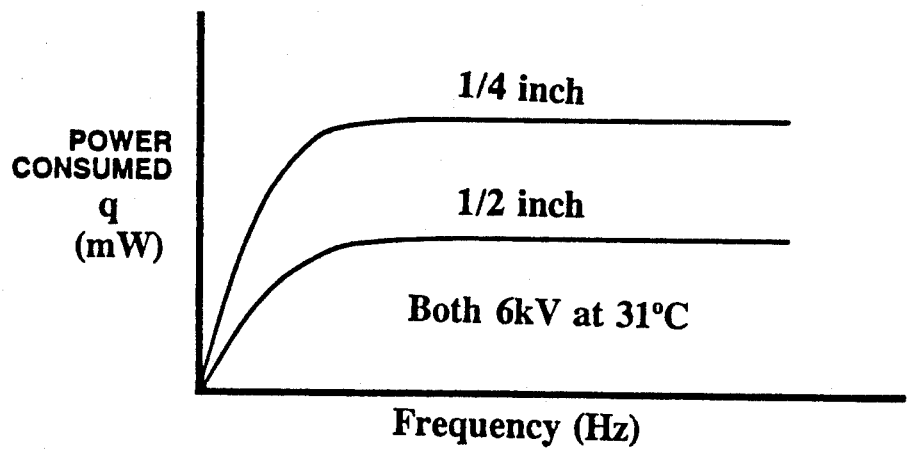
FIG. 12 is a plot showing the effect of LCHV thickness on the power required/heat generated q. Both LCHVs are essentially identical except for the thickness of the liquid crystal material being $\frac{1}{4}$ inch in one and $\frac{1}{8}$ inch in the other. The same batch MBBA was used in both LCHVs and they both are at the same frequency, voltage and temperature.
Figure 13:
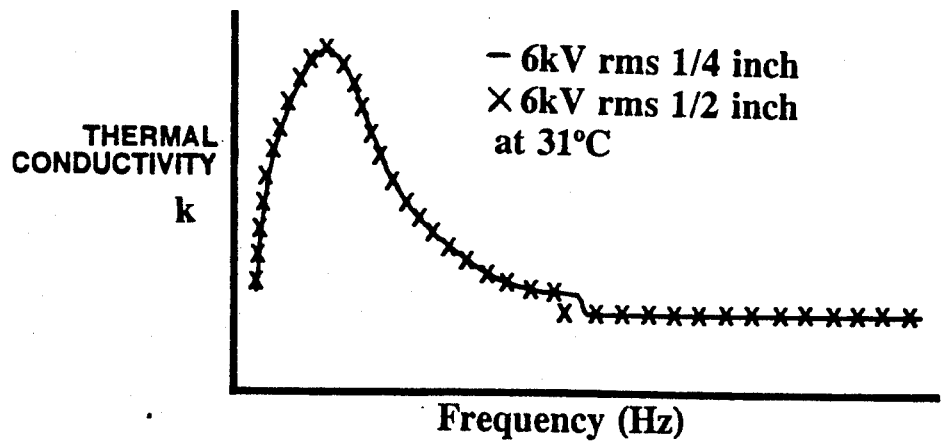
FIG. 13 is a plot showing that the effective thermal conductivity k remains essentially the same for two LCHVs of the same batch MBBA but different thicknesses as in FIG. 12 when at the same frequency, voltage, and temperature. However, the amount of actual heat transferred is halved for the $\frac{1}{8}$ LCHV as the heat has to be transferred twice as far through the same resistance.

10. Double layers of ions form near the electrodes and shield the bulk of the liquid crystal from the full applied field. This is discussed more fully in Biggers et al, in the upcoming publication in Molecular Crystals and Liquid Crystals; Sprokel, Resistivity, Permittivity and the Electrode Space Charge of Nematic Liquid Crystals, Mol. Cryst. and Liq. Cryst., Vol. 22, p. 249 (1973); Cognard, The Solid-Liquid Crystal Interface: Structure of the Double Layer Consequences for the Orientation of a Nematic Liquid Crystal Layer, J. Electroanal. Chem, 160, p. 305 (1984); and Blinov, Electro-Optical and Magneto-Optical Properties of Liquid Crystals, John Wiley & Sons Limited, p. 160 (1983). The shielding effectiveness of these double layers rapidly decreases to zero with increasing frequency, as is seen in FIG. 9. The maximum thermal transfer capability of the liquid crystal for any AC voltage occurs within this frequency range of formation of the double layers.

The main advantages of encapsulating a liquid-crystal heat valve as described are as follows.

There is essentially complete elimination of the electrochemical effects which can degrade the EHD motion because the electrodes are no longer in contact with the liquid crystal. Liquid crystals encapsulated in the above manner have demonstrated consistent LCHV behavior when evaluated for up to 6 months after encapsulation. See Biggers, cited above. Hence stable liquid-crystal materials in a sealed environment are expected to provide LCHV effects for a very long time period.

The amount of heat transferred can be predicted and much more accurately controlled for a known liquid crystal over a wide temperature range, applied AC voltage, and frequency range. The liquid crystal can be doped to an optimum resistivity which provides efficient heat transfer with a minimum power consumption due to joule heating.

Low frequencies, in the range of 30 to 130 Hz, provide the most thermal transfer at a constant voltage. The lower the temperature of the LCHV, the lower the frequency must be to obtain the maximum possible thermal transfer. Maximum insulation or the full-closed position of the LCHV is achieved by using higher frequencies in the range of 300 to 600 Hz. For thicker samples, such as those ⅛ an inch thick, and with a large temperature differences between the hot and cold bodies, the maximum insulating mode of the LCHV can be maintained after the high frequency field is removed. This insulation does not rely on boundary effects or external magnetic fields.

Increasing the temperature of the liquid crystal also increases the frequency at which maximum thermal transport occurs. The liquid crystal thermal-transport ability can be maximized at an operating temperature by using the proper predetermined frequency. See Table 1 above.

Because the LCHV behavior can be predicted for a wide range of operating temperatures, the effect of including LCHVs in a system can be calculated when the thermal properties of the other components are known. See Rish, A Two-Dimensional Analysis of Thermal Gradients in Skin covered by Composite Materials with Regions of High Thermal Conductivity, Tech. Memorandum, Naval Coastal Systems Center, Panama City, Fla. (1989)

Power consumption is reduced significantly at lower frequencies, e.g., 15 to 100 Hz for the described MBBA sample, due to double layer shielding. See the graph of FIG. 9. The maximum effective thermal conductivity in this frequency region can then chosen for operation and, at the maximum allowed voltage, corresponds to the full open position of the LCHV.

The LCHV is not restricted to encapsulation with Teflon and sapphire materials. LCHVs have been fabricated using heat sealable plastics, and these have functioned in much the same manner as those fabricated with Teflon and sapphire. There can be many different methods of encapsulation as long as several conditions are met. The encapsulating material must not contaminate the liquid-crystal material or change its resistivity. The encapsulating material should be very thin or have a high-thermal conductivity as not to impede thermal transfer. The encapsulating material must be stable under large electric fields and not be prone to dielectric heating. The encapsulating material or cell must allow for expansion and contraction of the liquid crystal without leakage or the formation of bubbles. The encapsulating material must also be essentially waterproof.

We claim:

1. A liquid-crystal heat valve positioned to control the flow of heat from a first thermally isolated body at a first temperature to a second thermally isolated body at a second temperature lower than the first temperature through a connection containing said heat valve, comprising:

A. A mass of liquid-crystal material chosen to have a nematic temperature range that includes both the first and second temperatures, B. An encapsulation cell enclosing the mass of liquid-crystal material and constructed of physically and chemically stable material which does not interact with the liquid-crystal material, C. At least two electrodes mounted proximate to at least part of the liquid-crystal material but electrically isolated therefrom for applying an electrical field across the liquid crystal material, D. A control voltage source connected to the electrodes and arranged to apply an alternating control voltage to the electrodes, the control voltage occurring generally between a lower frequency which causes the chosen liquid-crystal material to conduct heat substantially as well as it does at any frequency and a higher frequency which causes the liquid-crystal material to conduct heat substantially as poorly as it does at any frequency, the higher frequency being higher than the lower frequency, whereby the flow of heat from the first thermally isolated body to the second thermally isolated body is continuously controlled, at least in part, by the frequency of the control voltage applied to the electrodes.

2. A liquid crystal heat valve system according to claim 1, wherein the nematic temperature range includes a temperature at least 20° C. below the lowest expected temperature of the second thermally isolated body.

3. A liquid crystal heat valve system according to claim 2, further comprising means for applying higher frequency fields for electrically generating heat within the liquid crystal heat valve system for application to the first thermally isolated body.

4. A liquid-crystal heat valve system according to claim 2, wherein the encapsulation cell is constructed of two thin end disks of sapphire sealed to a thin non-reactive plastic spacer sleeve, and enclosing the liquid crystal material between the disks and the sleeve.

5. A liquid-crystal heat valve system according to claim 4, wherein the two electrodes are respectively situated adjacent to the two sapphire disks and outside the encapsulation cell.

6. A liquid-crystal heat valve system according to claim 1 for controlling the heat flow through the walls of a diving suit, further comprising, A. a diving suit for use by a diver primarily while the diver is under water, and B. means for mounting the heat valve of claim 1 in the walls of the diving suit in thermal proximity both to the diver and the water in which the diver is located, whereby the first thermally isolated body is that of a diver who occupies the diving suit, and the second thermally isolated body is the water in which the diver is located, and the heat valve is used to control the temperature of the inside of the diving suit.

7. A liquid-crystal heat valve system positioned to control the flow of heat from a first thermally isolated body at a first temperature to a second thermally isolated body at a second temperature, comprising:

A. A mass of liquid-crystal material chosen to have a nematic temperature range that includes both the first and second temperatures, and b. Means for applying a variable frequency electric field across the liquid crystal material, the frequency of the field varying between a first lower frequency range which causes the chosen liquid-crystal material to conduct heat substantially as well as it does at any frequency and a second frequency range higher than the first frequency range which causes the liquid-crystal material to conduct heat substantially as poorly as it does at any frequency, whereby the flow of heat from the first thermally isolated body to the second thermally isolated body is continuously controlled, at least in part, by the frequency of the electric field.

8. A liquid-crystal heat valve system according to claim 7, wherein the nematic temperature range includes a temperature at least 20° C. below the lowest expected temperature of the second thermally isolated body.

9. A liquid-crystal heat valve system according to claim 7, wherein the means for applying a variable frequency electrical field includes provision for applying field in a third frequency range which causes a significant increase in heat generation while maintaining conditions of poor heat conductivity.

10. A liquid-crystal heat valve positioned to control the flow of heat from a first thermally isolated body at a first temperature to a second thermally isolated body at a second temperature lower than the first temperature through a connection containing said heat valve, comprising:

a mass of liquid-crystal material chosen to have a nematic temperature range that includes both the first and second temperatures, an encapsulation cell enclosing the mass of liquid-crystal material and constructed of physically and chemically stable material which does not interact with the liquid-crystal material, at least two electrodes mounted proximate to at least part of the liquid-crystal material but electrically isolated therefrom for applying an electrical field across the liquid crystal material, a control voltage source connected to the electrodes and arranged to apply an alternating control voltage to the electrodes, the control voltage occurring generally between a lower frequency which causes the chosen liquid-crystal material to conduct heat substantially as well as it does at any frequency and a higher frequency which causes the liquid-crystal material to conduct heat substantially as poorly as it does at any frequency, the higher frequency being higher than the lower frequency, and heat-generating means for applying control voltages to said electrodes at a frequency still higher than said higher frequency alternating control voltage for electrically generating heat within the liquid crystal heat valve system for application to the first thermally isolated body, whereby the flow of heat from the first thermally isolated body to the second thermally isolated body is continuously controlled, at least in part, by the frequency of the control voltage applied to the electrodes, when the frequency is between said lower frequency and said higher frequency, and wherein heat for application to the first thermally isolated body is generated within the liquid crystal when said still higher frequency control voltage is applied to the electrodes.

* * * * *